US012673498B2

(12) United States Patent
Ueno

(10) Patent No.: US 12,673,498 B2
(45) Date of Patent: Jul. 7, 2026

(54) INKJET RECORDING APPARATUS

(71) Applicant: KYOCERA Document Solutions Inc., Osaka (JP)

(72) Inventor: Daijiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 143 days.

(21) Appl. No.: 18/822,919

(22) Filed: Sep. 3, 2024

(65) Prior Publication Data

US 2025/0083442 A1 Mar. 13, 2025

(30) Foreign Application Priority Data

Sep. 7, 2023 (JP) ................................ 2023-144952

(51) Int. Cl.
*B41J 2/165* (2006.01)

(52) U.S. Cl.
CPC ....... *B41J 2/16547* (2013.01); *B41J 2/16511* (2013.01); *B41J 2/16535* (2013.01); *B41J 2/16585* (2013.01); *B41P 2235/20* (2013.01)

(58) Field of Classification Search
CPC ................ B41J 2/16547; B41J 2/16511; B41J 2/16535; B41J 2/16585; B41P 2235/20
See application file for complete search history.

(56) References Cited

U.S. PATENT DOCUMENTS

| | | | | |
|---|---|---|---|---|
| 6,328,412 B1 * | 12/2001 | Taylor | B41J 2/16547 347/29 |
| 8,398,203 B2 | 3/2013 | Yoshihisa | |
| 8,899,720 B2 | 12/2014 | Yoshihisa | |
| 2001/0012027 A1 * | 8/2001 | Murcia | B41J 2/16508 347/29 |
| 2010/0149252 A1 * | 6/2010 | Yoshihisa | B41J 2/16547 347/32 |

FOREIGN PATENT DOCUMENTS

| | | | |
|---|---|---|---|
| JP | 2004001492 A * | 1/2004 | B41J 2/165 |
| JP | 2010-142981 A | 7/2010 | |

* cited by examiner

*Primary Examiner* — Yaovi M Ameh
(74) *Attorney, Agent, or Firm* — Studebaker Brackett PLLC

(57) ABSTRACT

An ink jet recording apparatus includes a head unit, a cap unit, a wipe unit, a cover, an engagement member, a first cam, a second cam, a lifting mechanism, and a sliding mechanism. In the first state, the first cam moves the engagement member downward to the predetermined height or below and the second cam brings the cover into contact with the wipe unit, in the second state, the first cam moves the engagement member downward to the predetermined height or below and the second cam moves the cover upward to a height higher than the first state, and in the third state, the first cam moves the engagement member upward to the predetermined height or above and the second cam moves the cover upward to a height higher than the first state.

4 Claims, 17 Drawing Sheets

INKJET RECORDING APPARATUS

INCORPORATION BY REFERENCE

This application is based on and claims the benefit of priority from Japanese patent application No. 2023-144952 filed on Sep. 7, 2023, which is incorporated by reference in its entirety.

BACKGROUND

The present disclosure relates to an inkjet recording apparatus.

An inkjet recording apparatus provided with a maintenance device which performs maintenance of an inkjet head is known. The maintenance device includes, for example, a wipe unit which wipes off ink remaining on a nozzle surface with a blade after purging the ink, and a cap unit which covers the nozzle surface with a cap during a period when printing is not performed.

To perform the maintenance, it is necessary to increase a distance between the inkjet head and a conveyance path along which a sheet is conveyed and to move the wipe unit and the cap unit to a position facing the nozzle surface. For example, the inkjet recording apparatus may include a support member which supports a plurality of the maintenance devices, a simultaneous moving mechanism which moves the support member between a maintenance position and a retracted position, and an individual moving mechanism which individually moves each of the maintenance devices on the support member in a direction closer to and separated from the inkjet head.

However, in the above configuration, there is a problem that a number of driving sources increases, resulting in an increase in a size of the device and an increase in cost.

SUMMARY

An ink jet recording apparatus according to the present disclosure includes a head unit, a cap unit, a wipe unit, a cover, an engagement member, a first cam, a second cam, a lifting mechanism, and a sliding mechanism. The head unit includes one or more inkjet heads. The cap unit includes a cap covering a nozzle surface of the inkjet head. The wipe unit is mounted on the cap unit, and cleans the nozzle surface. The cover is provided above the wipe unit. The engagement member is provided so as to be movable upward and downward, and is engaged with the wipe unit to separate the wipe unit from the cap unit when it is moved upward higher than a predetermined height. The first cam moves the engagement member upward and downward. The second cam is interlocked with the first cam, and moves the cover upward and downward. The lifting device lifts and lowers the head unit relative to a conveyance path along which a sheet is conveyed. The sliding device slides the cap unit to a maintenance position below the head unit relatively lifted by the lifting device and a home position on a lateral side of the maintenance position. The first cam and the second cam are displaced into a first state, a second state and a third state. In the first state, the first cam moves the engagement member downward to the predetermined height or below and the second cam brings the cover into contact with the wipe unit, in the second state, the first cam moves the engagement member downward to the predetermined height or below and the second cam moves the cover upward to a height higher than the first state, and in the third state, the first cam moves the engagement member upward to the predetermined height or above and the second cam moves the cover upward to a height higher than the first state.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus 1 according to a first embodiment of the present invention will be described.

Figure 1:
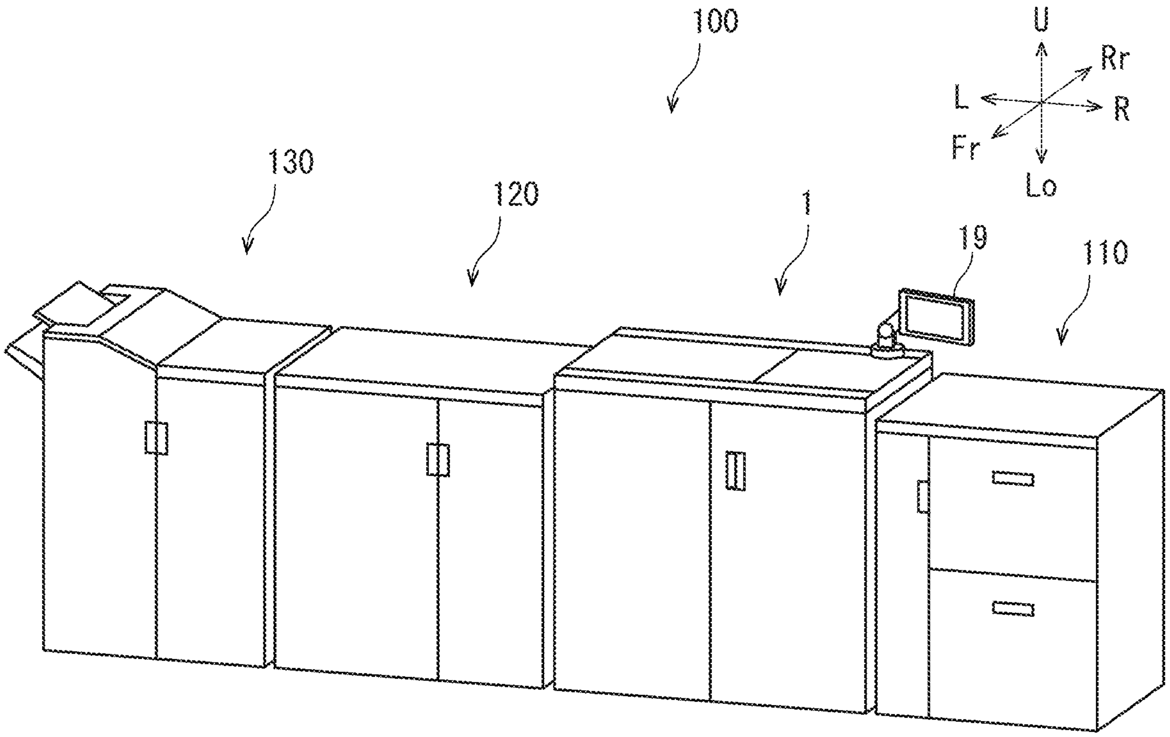
FIG. 1 is a perspective view showing an appearance of an image forming system according to one embodiment of the present invention.
Figure 2:
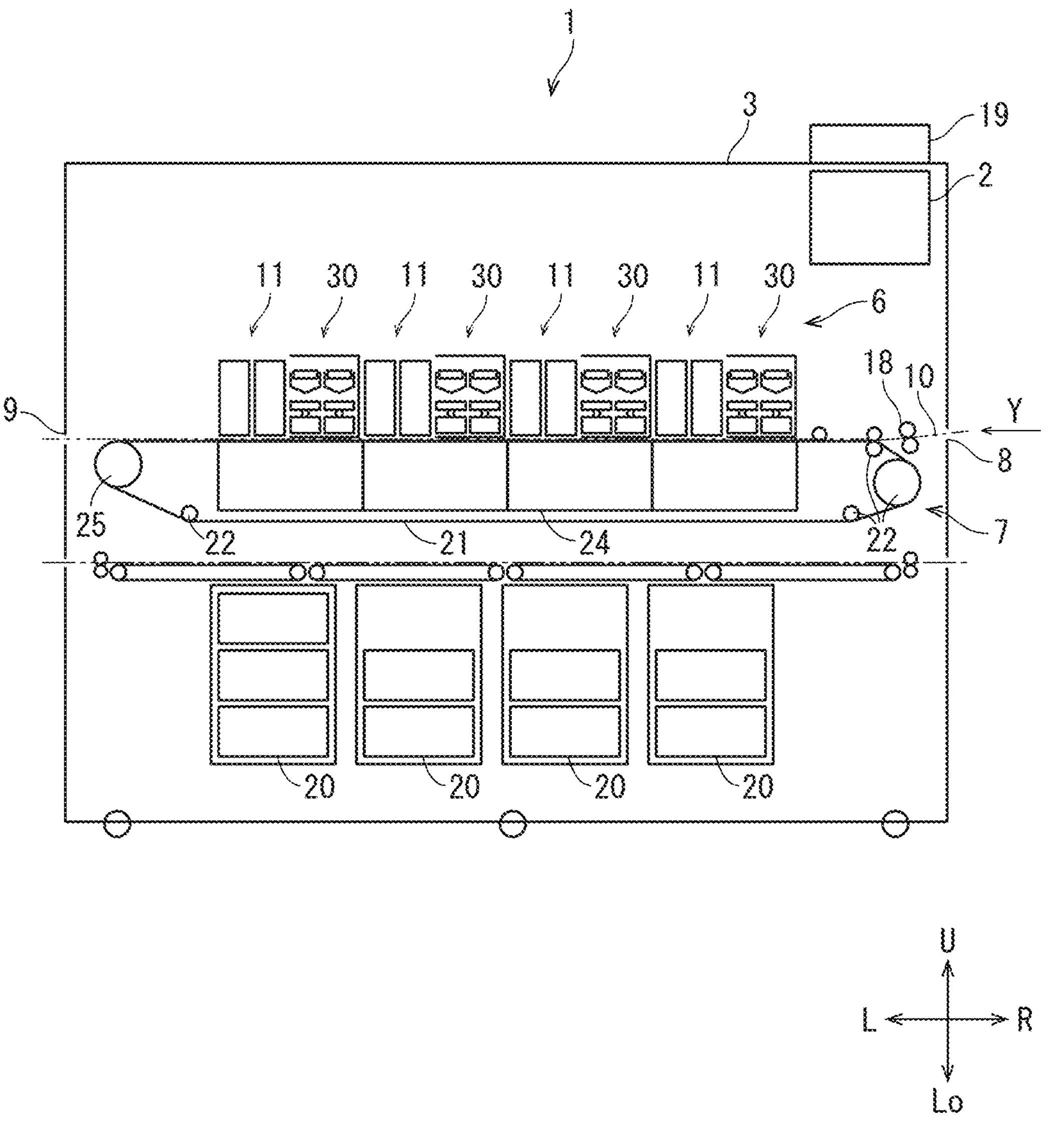
FIG. 2 is a front view schematically showing an internal structure of an inkjet recording apparatus according to the embodiment of the present invention.
Figure 3:
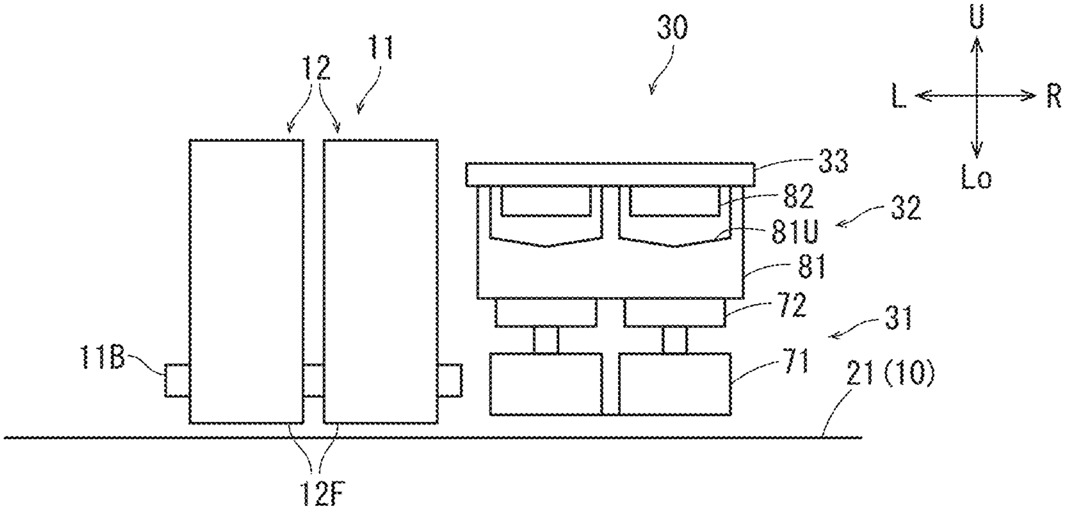
FIG. 3 is a front view schematically showing a head unit and a maintenance device according to the embodiment of the present invention.
Figure 4:
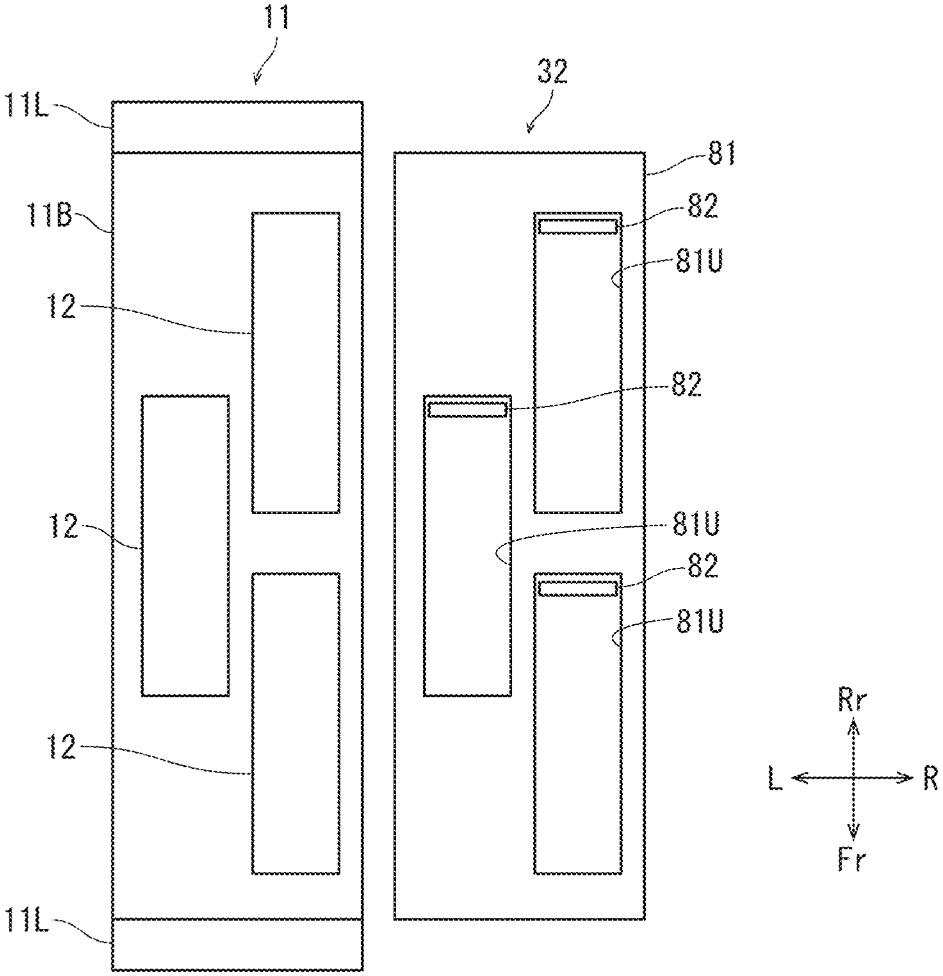
FIG. 4 is a plan view schematically showing the head unit and a wipe unit according to the embodiment of the present invention.
Figure 5:
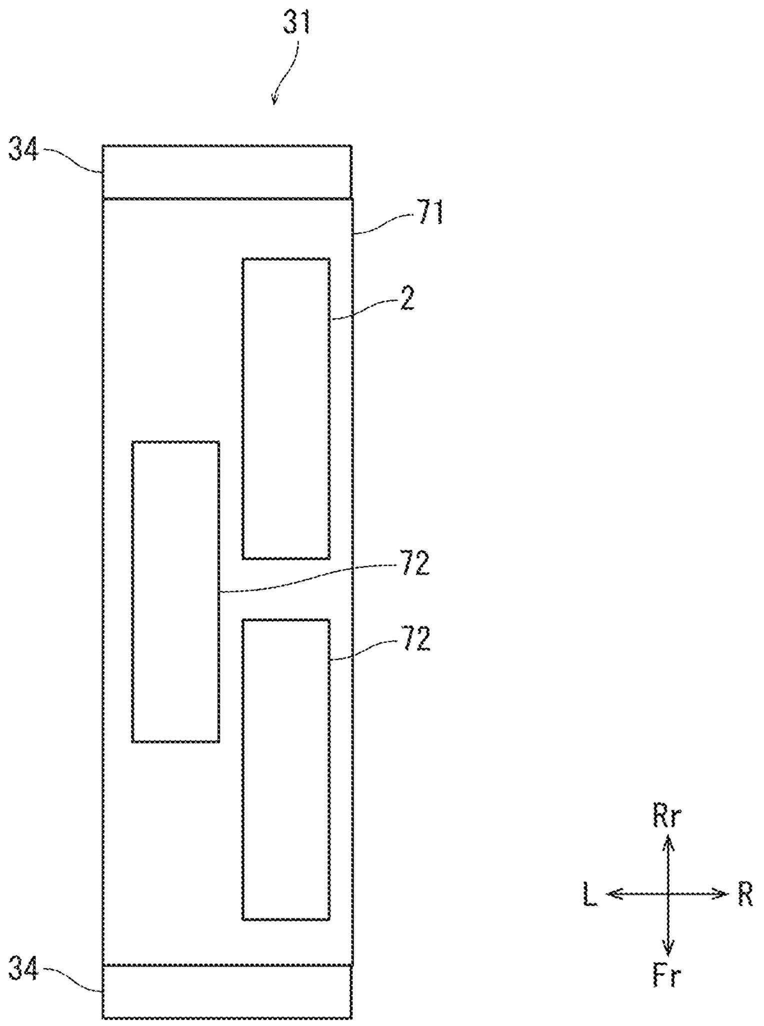
FIG. 5 is a plan view schematically showing the cap unit according to the embodiment of the present invention.

FIG. 1 is a perspective view showing the appearance of the image forming system 100. FIG. 2 is a front view schematically showing an internal structure of the inkjet recording apparatus 1. FIG. 3 is a front view schematically showing a head unit 11 and a maintenance device 30. FIG. 4 is a plan view schematically showing the head unit 11 and a wipe unit 32. FIG. 5 is a plan view schematically showing a cap unit 31. Hereinafter, the front side of the paper plane on which FIG. 2 is drawn will be referred to as the front side of the inkjet recording apparatus 1, and the left-and-right direction will be described with reference to the direction in which the inkjet recording apparatus 1 is viewed from the front side. In each figure, U, Lo, L, R, Fr, and Rr indicate an upper, lower, left, right, front, and rear, respectively.

The image forming system 100 (see FIG. 1) includes a sheet feeding device 110, an inkjet recording apparatus 1, a drying device 120, and a post-processing device 130. The sheet feeding device 110 stores several thousand sheets, and feeds the sheets to the inkjet recording apparatus 1. The inkjet recording apparatus 1 forms an image on the sheet by an inkjet method. The drying device 120 heats the ink ejected on the sheet to dry the ink. The post-processing device 130 performs post-processing such as punching, stapling, folding, or the like on the sheet S.

The inkjet recording apparatus 1 (see FIG. 2) includes a box-shaped body housing 3. In the center portion inside the body housing 3, a conveying unit 7 which attracts the sheet and conveys it in the Y direction is provided. Above the conveying unit 7, an image forming unit 6 which forms an image by ejecting the ink is provided. On the right side surface of the body housing 3, a sheet feeding port 8 through which the sheet is introduced from the sheet feeding device 110 is provided. On the left side surface of the body housing 3, a discharge port 9 through which the sheet on which the image is formed is discharged to the drying device 120 is provided. Inside the body housing 3, a conveyance path 10 is provided from the sheet feeding port 8 to the discharge port 9 between the conveying unit 7 and the image forming unit 6. A registration roller 18 is provided on the upstream side of the conveying unit 7 in the conveyance direction Y.

The conveying unit 7 includes an endless conveying belt 21 and a suction part 24. The conveying belt 21 has a large number of air holes (not shown), and is wound around a driving roller 25 and a driven roller 22. The upper surface of the suction part 24 has a large number of air holes (not shown), and is in contact with the inner surface of the conveying belt 21. The suction part 24 sucks air through the air holes of the conveying belt 21 and the air holes of the suction part 24, thereby attracting the sheet S to the conveying belt 21. When the driving roller 25 is driven in the counterclockwise direction by a driving part (not shown) including a motor and a reduction gear, the conveying belt 21 travels in the counterclockwise direction, and the sheet S attracted to the conveying belt 21 is conveyed in the Y direction.

The image forming unit 6 includes a plurality (in this embodiment, four) of head units 11. The head unit 11 (see FIG. 3 and FIG. 4) includes one or more (in this embodiment, three) inkjet heads 12. Ink containers 20 filled with the black, cyan, magenta and yellow inks are connected to the head units 11. On the right side of each head unit 11, a maintenance device 30 which performs maintenance of the inkjet head 12 is provided.

The control part 2 (see FIG. 2) includes an arithmetic part and a storage part (not shown). The arithmetic part is, for example, a CPU (Central Processing Unit). The storage part includes a storage medium such as a ROM (Read Only Memory), a RAM (Random Access Memory), an EEPROM (Electrically Erasable Programmable Read Only Memory), and the like. The arithmetic part reads out the control program stored in the storage part and executes various processes. The control part 2 may be implemented by an integrated circuit that does not use software.

A display operation part 19 is provided on the upper portion of the body housing 3 (see FIG. 1 and FIG. 2). The display operation part 19 includes a display panel, a touch panel laminated on the display panel, and a keypad (not shown). The control part 2 displays a screen representing an operation menu, a status, or the like of the inkjet recording apparatus 1 on the display panel, and controls each part of the inkjet recording apparatus 1 in accordance with an operation detected by the touch panel and the keypad.

The basic image forming operation of the inkjet recording apparatus 1 is as follows. When an image forming job is inputted to the inkjet recording apparatus 1 from the display operation part 19 or an external computer, the sheet feeding device 110 feeds the sheet S to the conveyance path 10 through the sheet feeding port 8, and the registration roller 18 whose rotation is stopped corrects the skew of the sheet S. When the registration roller 18 sends the sheet S to the conveying unit 7 at a predetermined timing, the conveying unit 7 attracts the sheet S to the conveying belt 21 and conveys the sheet S in the Y direction. The ink is ejected from the inkjet head 12 to form an image on the sheet SS on which the image is formed is discharged to the drying device 120 through the discharge port 9.

Figure 6:
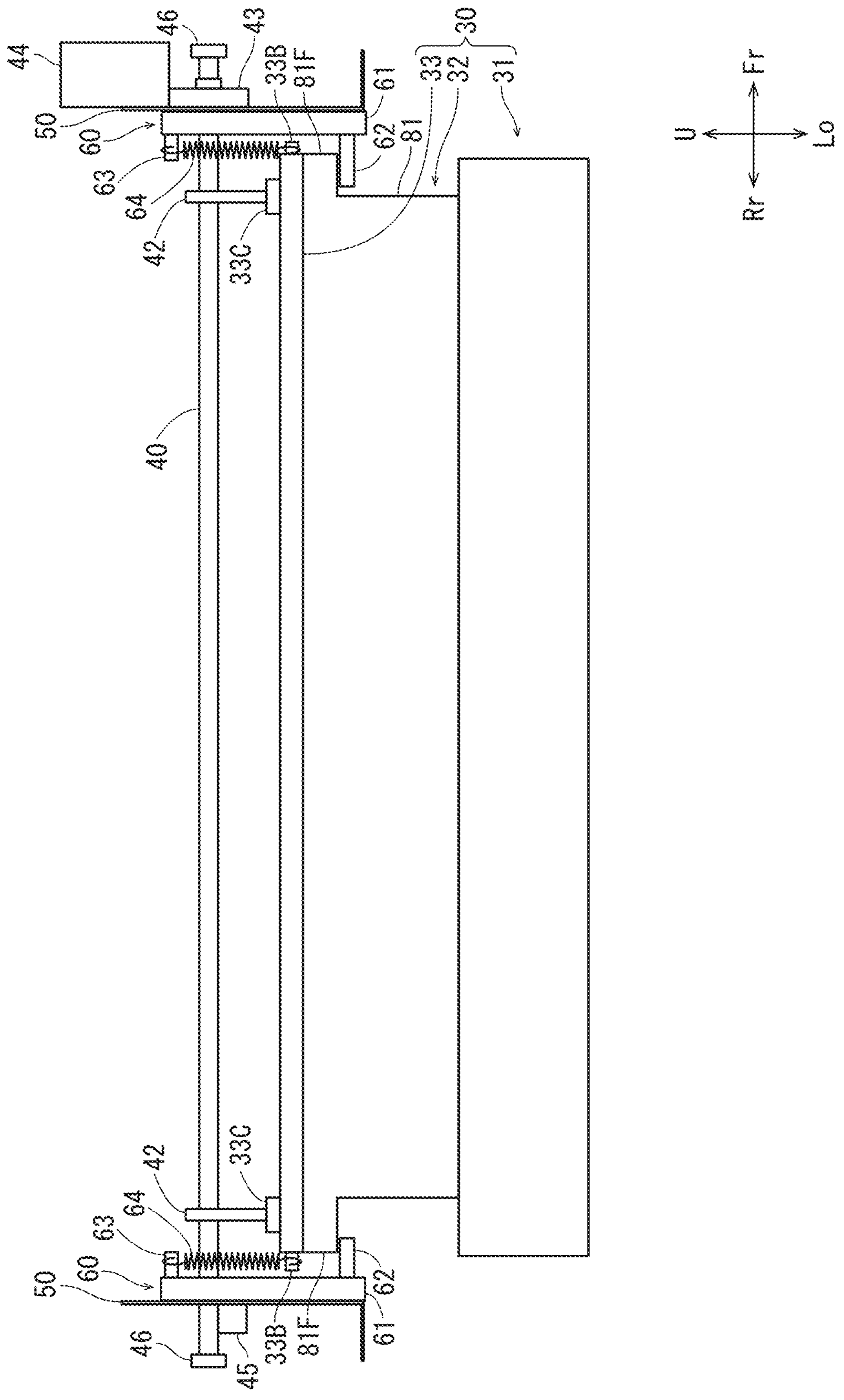
FIG. 6 is a left side view showing the maintenance device according to the embodiment of the present invention.
Figure 7:
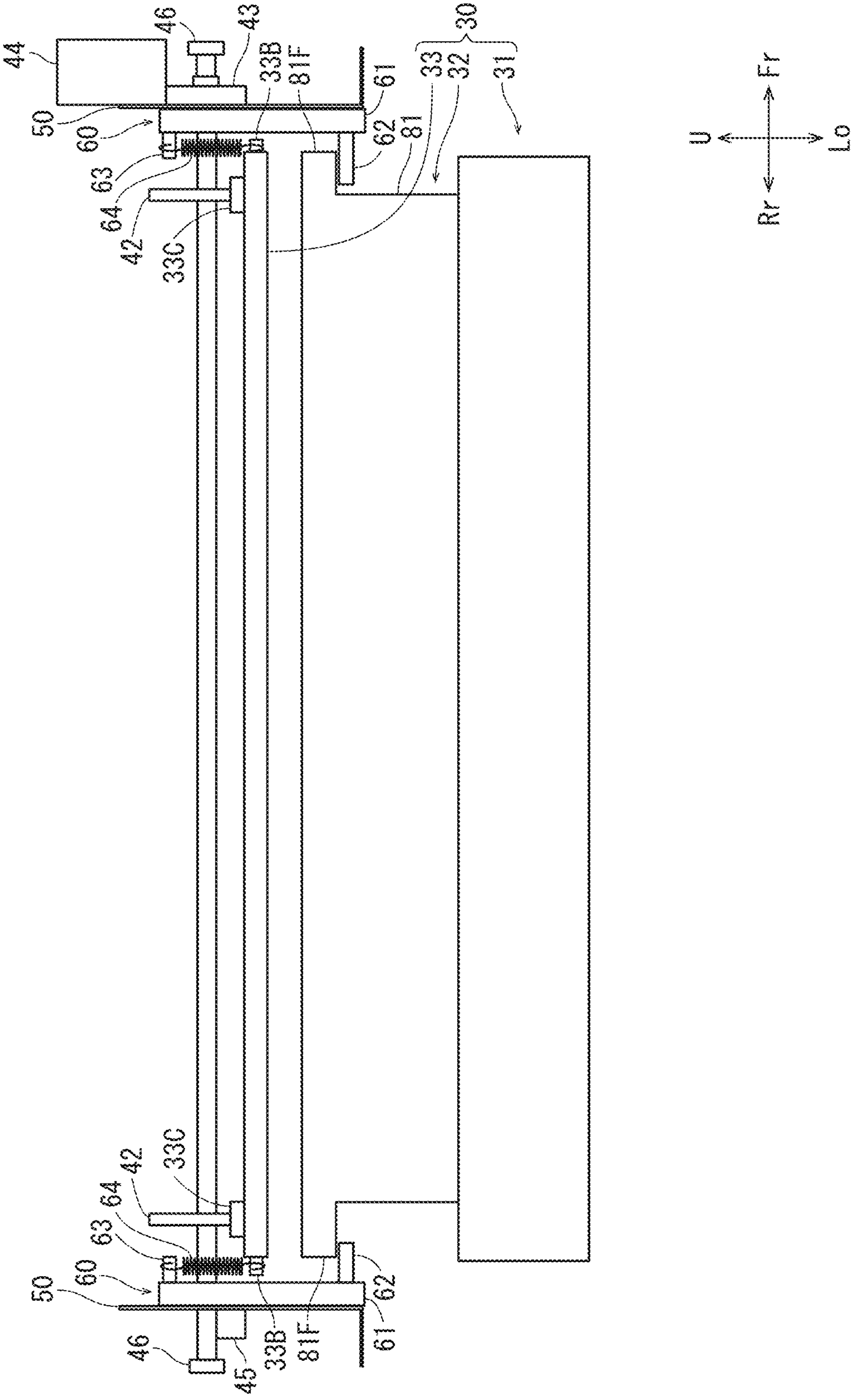
FIG. 7 is a left side view showing the maintenance device according to the embodiment of the present invention.
Figure 8:
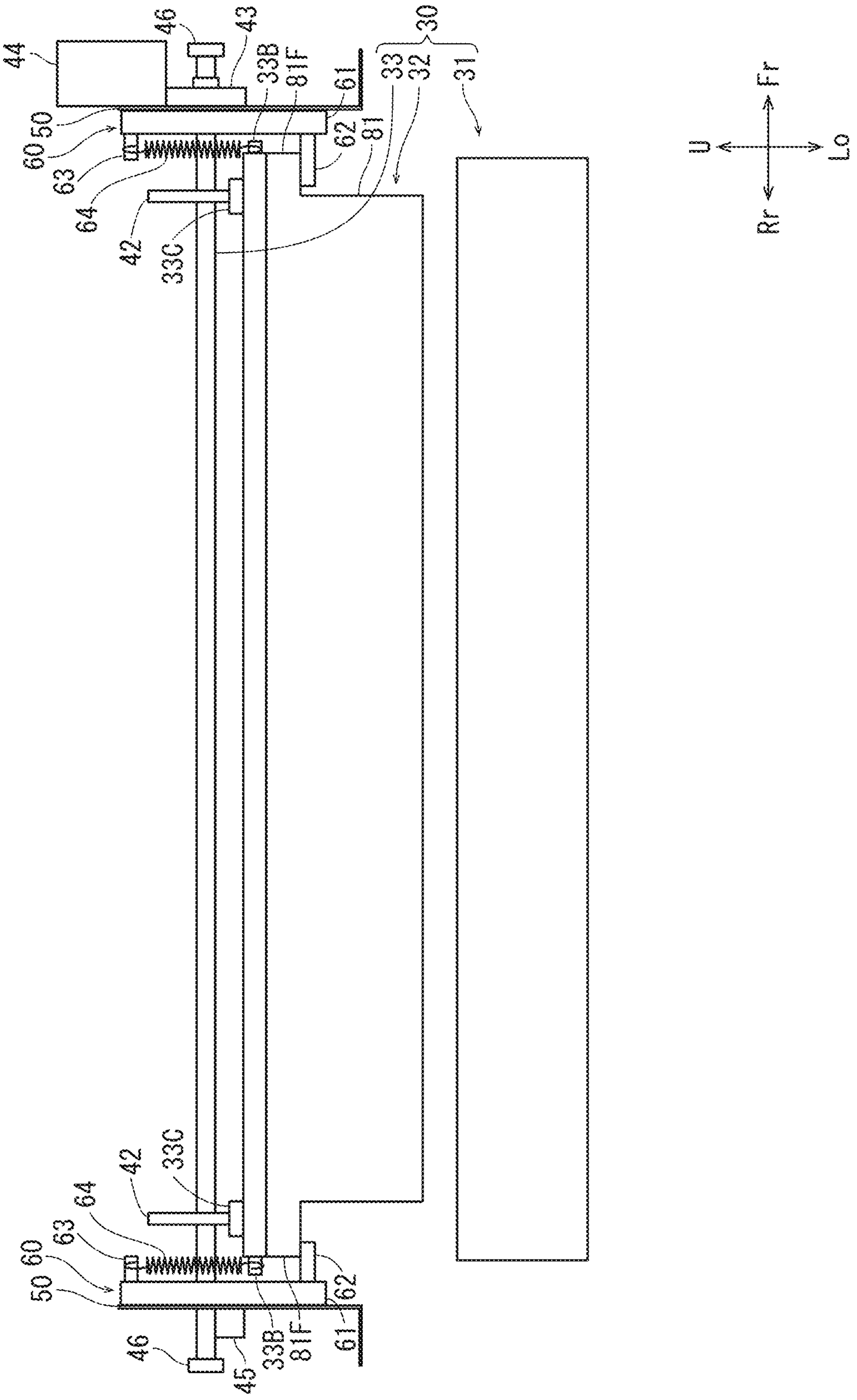
FIG. 8 is a left side view showing the maintenance device according to the embodiment of the present invention.
Figure 9:
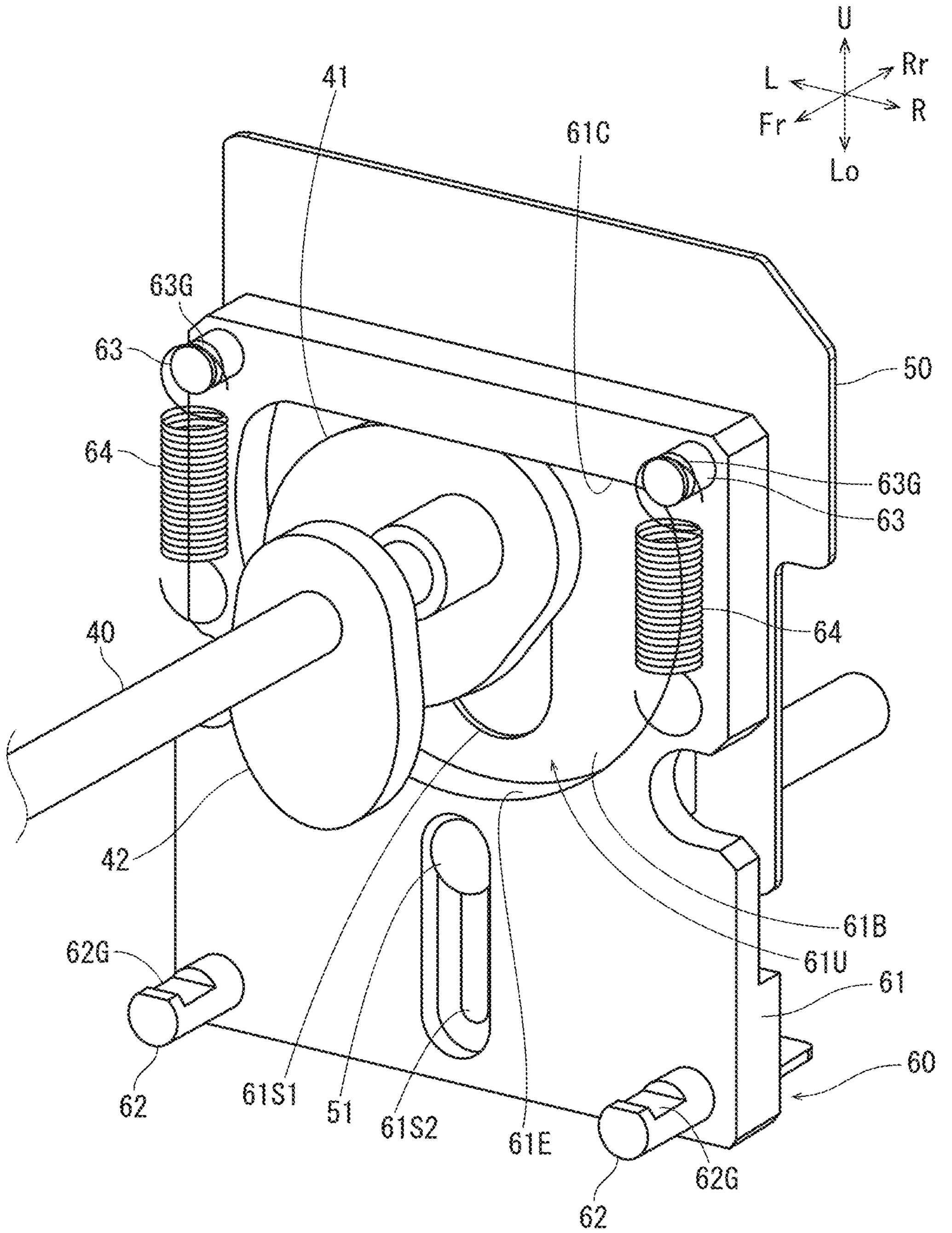
FIG. 9 is a perspective view showing a rear portion of the maintenance device according to the embodiment of the present invention.
Figure 10:
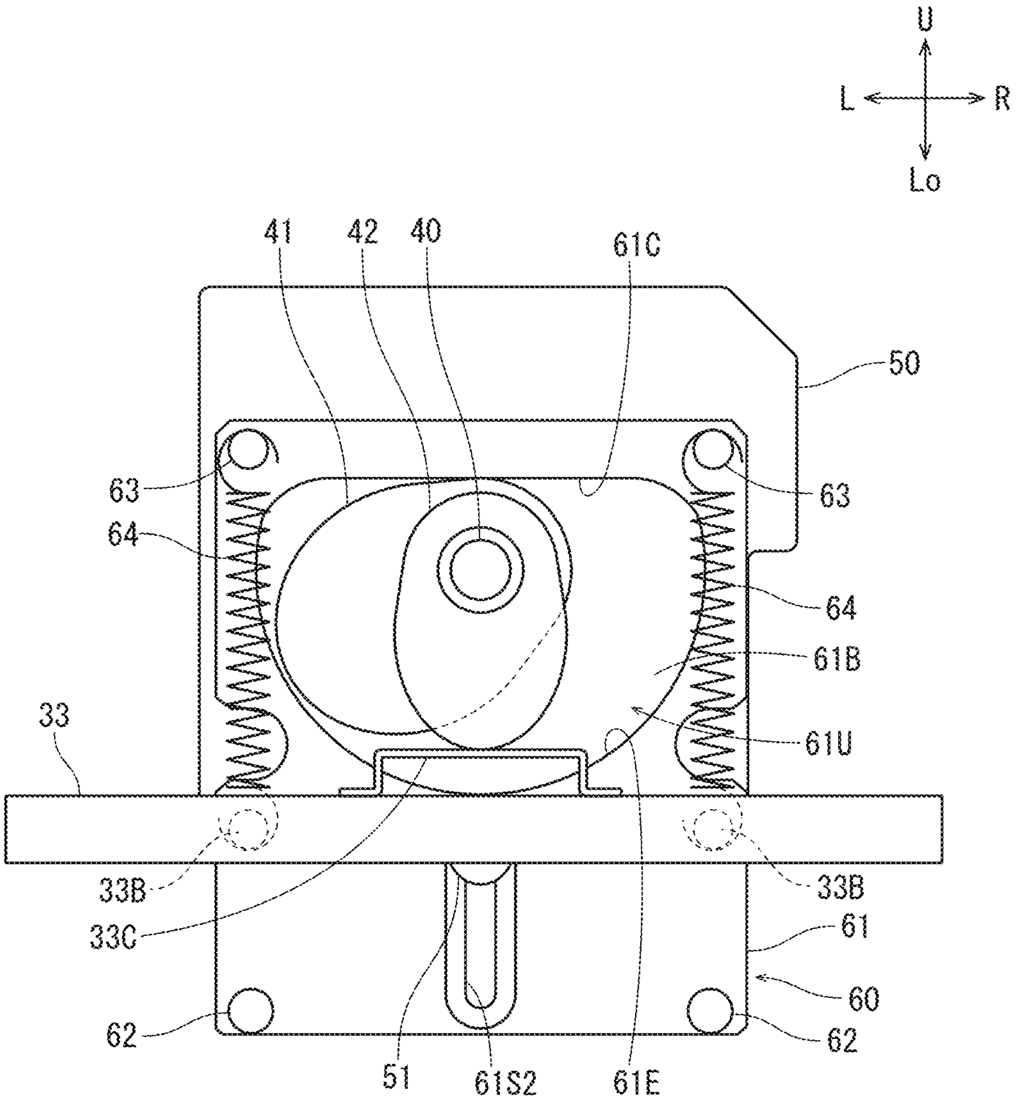
FIG. 10 is a front view showing a first state according to the embodiment of the present invention.
Figure 11:
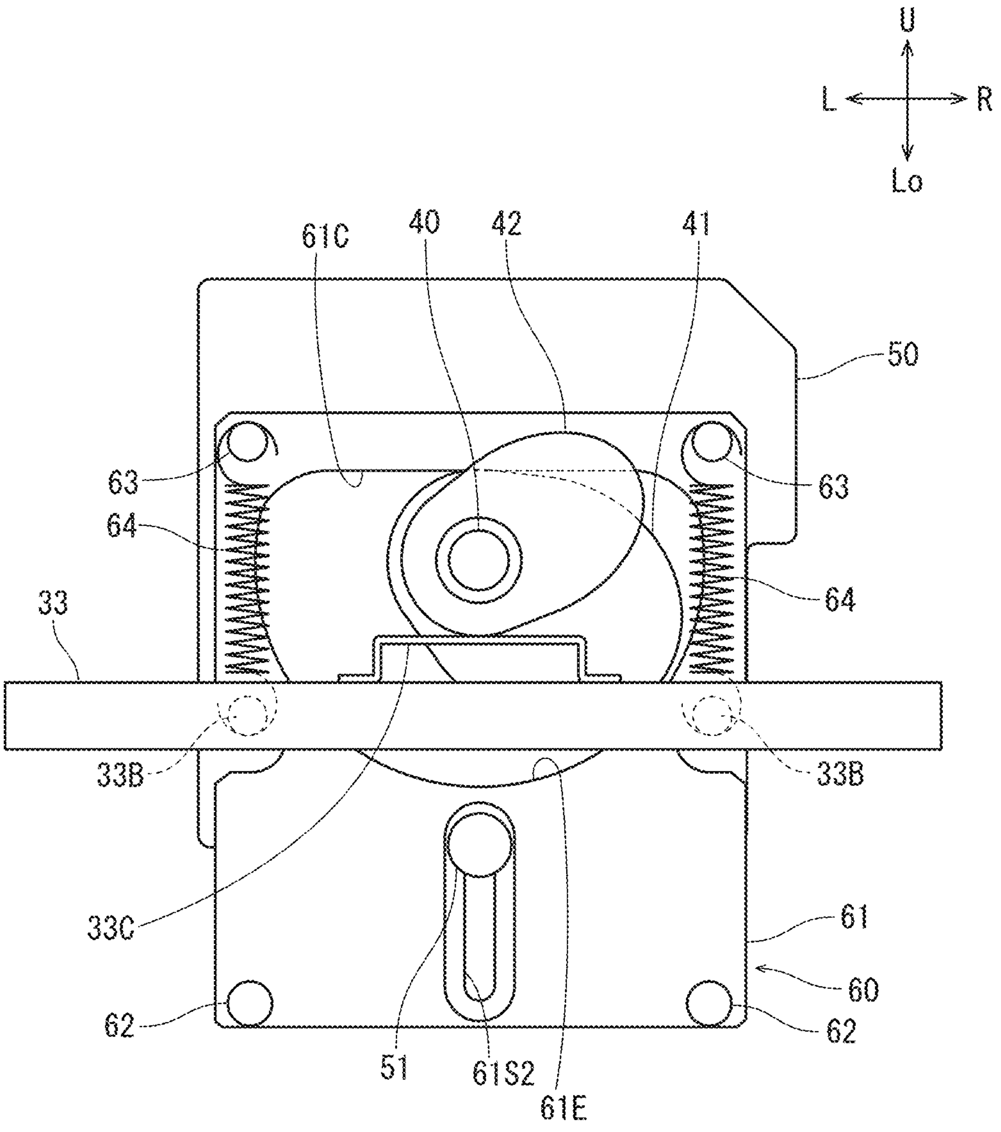
FIG. 11 is a front view showing a second state according to the embodiment of the present invention.
Figure 12:
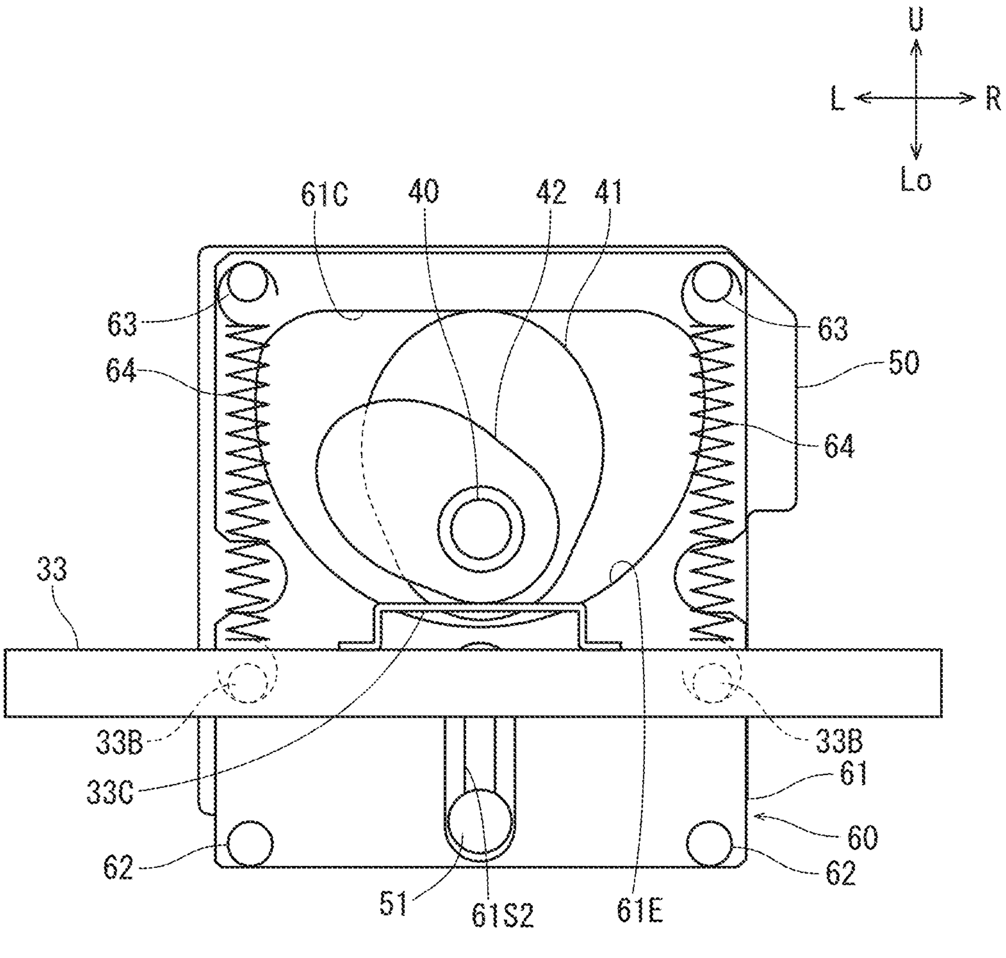
FIG. 12 is a front view showing a third state according to the embodiment of the present invention.

Next, a characteristic configuration of the present embodiment will be described. FIG. 6 to FIG. 8 are left side views showing the maintenance device 30. FIG. 9 is a perspective view showing the rear portion of the maintenance device 30. FIG. 10 is a front view showing a first state. FIG. 11 is a front view showing a second state. FIG. 12 is a front view showing a third state. FIG. 13 to FIG. 18 are front views showing the operation of the maintenance device 30.

The inkjet recording apparatus 1 according to the present embodiment includes the hard unit 11, a cap unit 31, a wipe unit 32, a cover 33, an engagement member 60, a first cam 41, a second cam 42, a lifting device 11L, and a sliding device 34. The head unit 11 includes one or more inkjet heads 12. The cap unit 31 includes a cap 72 covering the nozzle surface 12F of the inkjet head 12. The wipe unit 32 is mounted on the cap unit 31 and cleans the nozzle surface 12F. The cover 33 is provided above the wipe unit 32. The engagement member 60 is provided so as to be movable upward and downward, and is engaged with the wipe unit 32 to separate the wipe unit 32 from the cap unit 31 when it is moved upward to a predetermined height or above. The first cam 41 moves the engagement member 60 upward and downward. The second cam 42 is interlocked with the first cam 41, and moves the cover 33 upward and downward. The lifting device 11L lifts and lowers the head unit 11 relative to the conveyance path 10 along which the sheet S is conveyed. The sliding device 34 slides the cap unit 31 to a maintenance position below the head unit 11 relatively lifted by the lifting device 11L and a home position on a lateral side of the maintenance position. The first cam 41 and the second cam 42 are displaced into a first state, a second state and a third state. In the first state, the first cam 41 moves the engagement member 60 downward to a predetermined height or below and the second cam 42 brings the cover 33 contact with the wipe unit 32. In the second state, the first cam 41 moves the engagement member 60 downward to the predetermined height or below and the second cam 42 lifts the cover 33 to a height higher than the first state. In the third state, the first cam 41 moves the engagement member 60 upward to the predetermined height or above and the second cam 42 lifts the cover 33 to a height higher than the first state.

Since the four head units 11 have the same configuration and the four maintenance devices 30 have the same configuration, one head unit 11 and one maintenance device 30 provided on the right side thereof will be described below (see FIG. 3).

[Head Unit] The head unit 11 includes a head base 11B (see FIG. 3 and FIG. 4) which supports the inkjet heads 12. On the head base 11B, the three inkjet heads 12 are provided in a staggered pattern. A nozzle surface 12F which is a lower surface of the inkjet head 12 is provided with ejection ports of the nozzles (not shown).

[Maintenance Device] The maintenance device 30 (see FIG. 3) is provided on the right side of the head unit 11. The maintenance device 30 includes the cap unit 31, the wipe unit 32, and the cover 33.

[Cap Unit] The cap unit 31 (see FIG. 3, FIG. 5 and FIG. 6) includes a cap 72 having the same number as the inkjet heads 12 provided in the head unit 11, and a frame 71 which supports the caps 72. The caps 72 are arranged in a staggered pattern in the same manner as the inkjet heads 12. The cap 72 is formed in a concave shape opened upward.

[Wipe Unit] The wipe unit 32 (see FIG. 3, FIG. 4 and FIG. 6) includes a waste liquid tray 81 and a cleaning member 82. The waste liquid tray 81 has the same number of recesses 81U as the inkjet heads 12 provided in the head unit 11. The recesses 81U are arranged in a staggered pattern in the same manner as the inkjet heads 12. The cleaning member 82 is provided in each of the recesses 81U. The cleaning member 82 is, for example, a blade. The waste liquid tray 81 includes a driving part (not shown) which slides the cleaning member 82 along the nozzle surface 12F. The waste liquid tray 81 is mounted on the caps 72. In other words, the wipe unit 32 is mounted on the cap unit 31. Flange portions 81F (see FIG. 6) protruding forward and rearward are provided on the upper end portions of both the front and rear surfaces of the waste liquid tray 81, respectively.

[Cover] The cover 33 (see FIG. 3 and FIG. 6) which covers the waste liquid tray 81 is provided above the wipe unit 32. On the front and rear end surfaces of the cover 33, bosses 33B protruding forward and backward are provided, respectively (see FIG. 6). The boss 33B is provided at two left and right positions on the front and rear end surfaces of the cover 33. The lower end of the tension spring 64 described later is engaged with the boss 33B.

[Support member, Shaft] A support member 50 (see FIG. 6 and FIG. 9) is provided on the front and rear sides of the maintenance device 30. The support members 50 is a plate-like members whose thickness direction is along the front-and-rear direction, and is fixed to the body housing 3. The shaft 40 is arranged with its longitudinal direction along the front-and-rear direction. The front and rear end portions of the shaft 40 are supported by bearings 46 provided in the body housing 3.

A driven gear 43 and a driving source 44 for driving the driven gear 43 are provided on either one of the front and rear end portions (in this embodiment, the front end portion) of the shaft 40. The driving source 44 includes, for example, a stepping motor and a gear train for transmitting the driving force to the driven gear 43 (not shown).

A rotation angle detection part 45 is provided on either one of the front and rear end portions (in this embodiment, the rear end portion) of the shaft 40. The rotation angle detection part 45 includes, for example, a photo interrupter and a detection piece (not shown). The detection piece protrudes from the shaft 40 in a direction intersecting the shaft 40. The control part 2 determines that the rotation angle of the shaft 40 is the home position when the photo interrupter detects the detection piece. The control part 2 controls the rotation angle of the shaft 40 by a number of pulses output to the stepping motor with reference to the home position.

Although the engagement member 60, the first cam 41, and the second cam 42 described below are provided on the front and rear sides of the maintenance device 30, the configuration of the engagement members 60, the first cams 41, and the second cams 42 provided on the front and rear side of the maintenance device 30 have basically the same configuration, so the rear configuration of the maintenance device 30 will be described below.

[Engagement Member] The engagement member 60 (see FIG. 9) is provided in front of the support member 50. The engagement member 60 includes a body part 61, an engagement part 62, and a boss 63.

[Body Part] The body part 61 is formed in a plate shape whose thickness direction is along the front-and-rear direction. The body part 61 faces the support member 50 in the front-and-rear direction. On the front surface of the body part 61, a recess 61U is provided. The recess 61U has a bottom portion 61B parallel to the front surface of the body part 61 and an edge portion 61E connecting the bottom portion 61B and the front surface of the body part 61. The edge portion 61E is formed perpendicular to the bottom portion 61B and the front surface of the body part 61. The upper portion of the edge portion 61E is formed to be a horizontal surface (contact portion 61C). The first cam 41 is in contact with the contact portion 61C. A portion of the edge portion 61E below the contact portion 61C is formed in an arc shape when viewed from the front side.

In the center portion of the bottom portion 61B, a slit 61S1 whose longitudinal direction is along the upper-and-lower direction is provided. The shaft 40 is inserted into the slit 61S1. Below the recess 61U, a slit 61S2 whose longitudinal direction is along the upper-and-lower direction is provided. On the front surface of the support member 50, a pin 51 is provided at a position corresponding to the slit 61S2. The pin 51 is inserted into the slit 61S2. A diameter of the head of the pin 51 is larger than the width of the slit 61S1 in the left-and-right direction, thereby restricting the forward movement of the body part 61.

The length of the slit 61S1 and the length of the slit 61S2 are equal. When the shaft 40 is located at the upper end of the slit 61S1, the pin 51 is located at the upper end of the slit 61S2. With this configuration, the engagement member 60 can be moved upward and downward. FIG. 6, FIG. 9 and FIG. 10 show a state in which the engagement member 60 is positioned at a lower limit position of the movable range. On the other hand, FIG. 8 and FIG. 12 show a state in which the engagement member 60 is positioned at the upper limit position of the movable range.

[Engagement Part] The engagement part 62 protrudes from the lower portion of the front surface of the body part 61. The engagement part 62 is provided at two positions in the left-and-right direction. The engagement parts 62 are provided at the same height as the lower end of the slit **61*s*2. When the engagement member 60 is moved upward to a predetermined height, the engagement part 62 is engaged with the flange portion 81F of the waste liquid tray 81. Further, when the engagement member 60 is moved upward to the predetermined height or above, the waste liquid tray 81 is lifted by the engagement part 62, and the waste liquid tray 81 is separated from the caps 72 (see FIG. 8**).

The engagement part 62 is formed in a cylindrical shape. In the upper portion of the engagement part 62, a groove 62G (see FIG. 9) is provided in the left-and-right direction.

The lower surface of the flange portion 81F is provided with a protruding portion which is engaged with the groove 62G when the engagement member 60 is moved upward to the predetermined height (not shown). By engaging the protruding portion with the groove 62G, the displacement of the cover 33 is suppressed and the upward and downward moving operation is stabilized.

The groove 62G may not be provided. A horizontal plane may be formed in place of the groove 62G. The engagement part 62 may be formed in a rectangular column or any other shape. In short, the engagement member 60 according to the present embodiment is an example of a configuration which is engaged with the waste liquid tray 81 to separate the waste liquid tray 81 from the cap unit when the engagement member 60 is moved upward to the predetermined height or above.

[Boss] The boss 63 protrudes from the upper portion of the front surface of the body part 61. The boss 63 is provided at two locations in the left- and right-direction. The boss 63 is provided with a circumferential groove 63G. The groove 63G is engaged with the upper end of the tension spring 64 described later.

[First Cam] The first cam 41 is a plate cam or an eccentric cam whose thickness direction is along the front-and-rear direction, and is provided on the shaft 40. The first cam 41 does not rotate relative to the shaft 40, but rotates together with the shaft 40 by the same rotation angle as the shaft 40. As viewed from the front, the first cam 41 is disposed inside the recess 61U. The rear surface of the first cam 41 faces the bottom portion 61B of the recess 61U. The first cam 41 is disposed below the contact portion 61C.

When the shortest portion (the shortest diameter portion) of the first cam 41 is in contact with the contact portion 61C (see FIG. 10 and FIG. 11), the engagement member 60 is positioned at the lower limit position. On the other hand, when the longest portion (the longest diameter portion) of the first cam 41 is in contact with the contact portion 61C (see FIG. 12), the engagement member 60 is positioned at the upper limit position.

[Second Cam] The second cam 42 is a plate cam or an eccentric cam whose thickness direction is along the front-and-rear direction, and is provided on the shaft 40. The second cam 42 does not rotate relative to the shaft 40, but rotates together with the shaft 40 by the same rotation angle as the shaft 40. The second cam 42 is disposed in front of the first cam 41. As viewed from the front (see FIG. 10), the first cam 41 is provided with the longest portion (the longest diameter portion) shifted in the clockwise direction by 60° with respect to the second cam 42.

A contact member 33C protruding upward is provided on both the front and rear end portions of the upper surface of the cover 33. The contact member 33C is provided below the second cam 42, and is in contact with the second cam 42. The second cam 42 may be in direct contact with the upper surface of the cover 33 without providing the contact member 33C.

When the longest portion of the second cam 42 is in contact with the contact member 33C (see FIG. 10), the cover 33 is positioned at the lower limit position. On the other hand, when the shortest portion of the second cam 42 is in contact with the contact member 33C (see FIG. 11 and FIG. 12), the cover 33 is positioned at the upper limit position.

[Tension Spring] The tension spring 64 is a coil spring whose longitudinal direction is along the upper-and-lower direction, and is provided on the left and right portions of the front surface of the engagement member 60. The upper end of the tension spring 64 is engaged with the boss 63 of the engagement member 60, and the lower end of the tension spring 64 is engaged with the boss 33B of the cover 33.

[Lifting Device] The lifting device 11L is provided on the front and rear sides of the head base 11B. The lifting device 11L includes, for example, a ball screw, a belt driving device, and the like. The lifting device 11L lifts and lowers the head unit 11 between an image forming position and a retracted position. The image forming position (see FIG. 13) is a position where a distance between the conveyance path 10 (the upper surface of the conveying belt 21) on which the sheet S is conveyed and the nozzle surface 12F is a predetermined distance suitable for the image forming. The image forming position is the lower limit position of the lifting range of the head unit 11 by the lifting device 11L. The retracted position (see FIG. 15) is a position where the head unit 11 does not interfere with the wipe unit 32 when the cap unit 31 and the wipe unit 32 are slid leftward using the sliding device 34 described later. The retracted position is the upper limit position of the lifting range of the head unit 11.

[Sliding Device] The sliding device 34 (see FIG. 5) is provided on the front and rear sides of the frame 71 of the cap unit 31. The sliding device 34 includes, for example, a ball screw, a belt driving device, and the like. The sliding device 34 slides the cap unit 31 to a home position and a maintenance position. The home position is a position on the right side of the head unit 11 positioned at the image forming position (see FIG. 13). The maintenance position is a position below the head unit 11 positioned at the retracted position (see FIG. 15).

Figure 13:
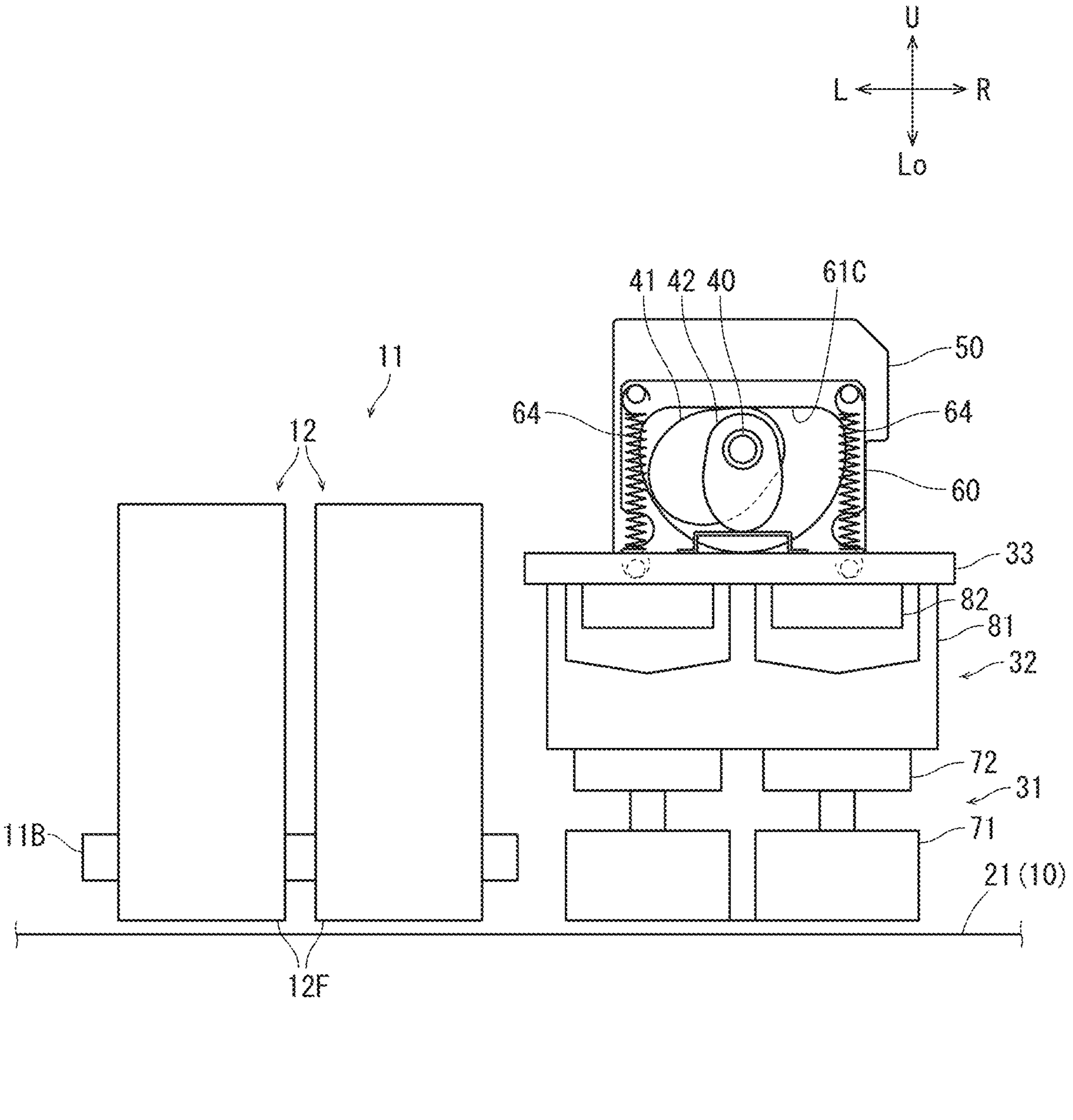
FIG. 13 is a front view showing the operation of the maintenance device according to the embodiment of the present invention.
Figure 14:
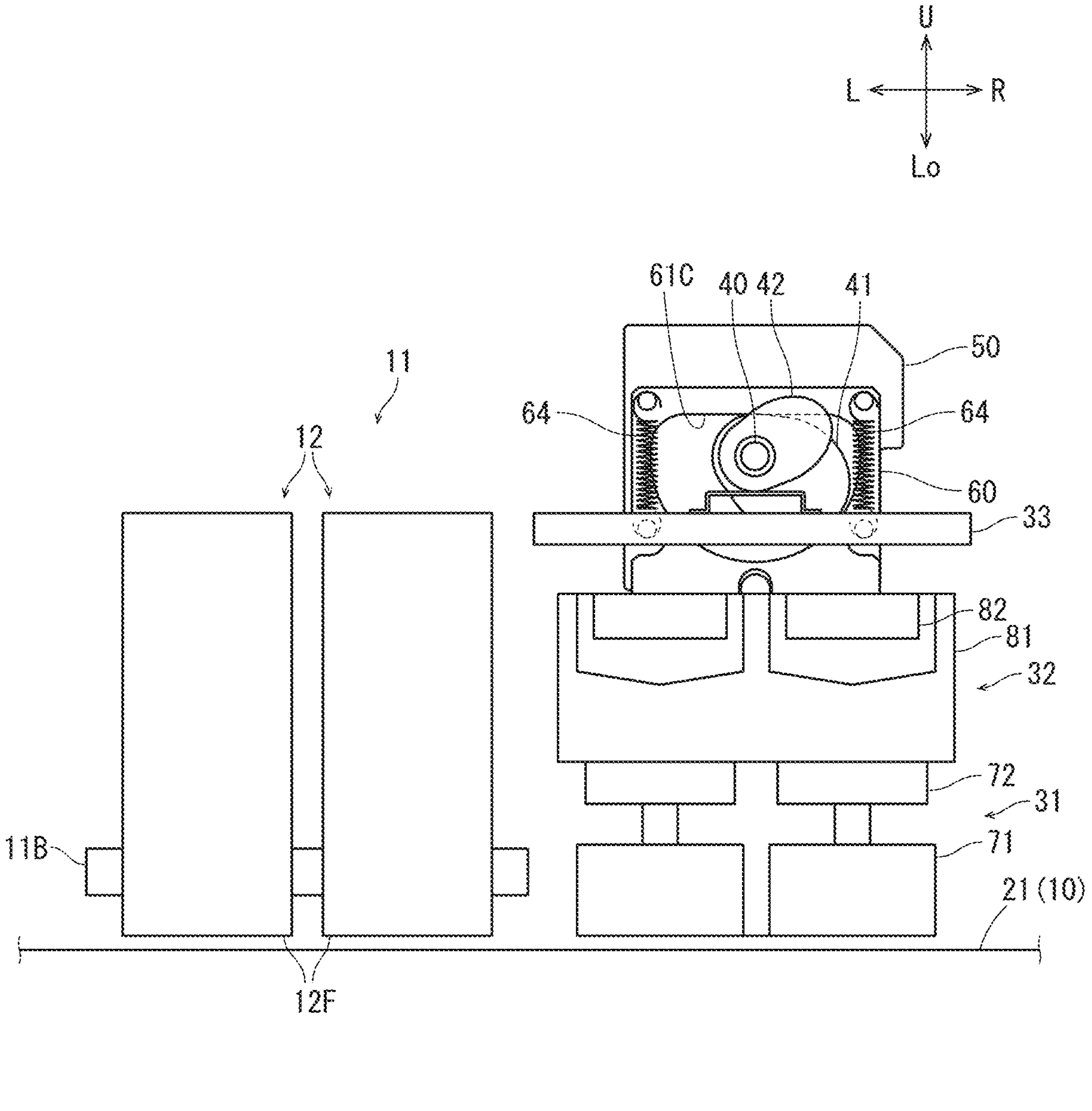
FIG. 14 is a front view showing the operation of the maintenance device according to the embodiment of the present invention.

Next, the operation of the head unit 11 and the maintenance device 30 according to the present embodiment will be described with reference to FIG. 6, FIG. 10 and FIG. 13 as the initial state. In the initial state, the head unit 11 is positioned at the image forming position, and the cap unit 31 is positioned at the home position. The wipe unit 32 is mounted on the cap unit 31, and the cover 33 is in contact with the waste liquid tray 81.

As viewed from the front side, the longest portion (the longest diameter portion) of the first cam 41 is positioned at 8 o'clock, and the longest portion of the second cam 42 is positioned at 6 o'clock. In this case, since the shortest portion (the shortest diameter portion) of the first cam 41 is in contact with the contact portion 61C of the engagement member 60, the engagement member 60 is positioned at the lower limit position. Since the longest portion of the second cam 42 is in contact with the contact member 33C of the cover 33, the cover 33 is also positioned at the lower limit position.

The following operations are performed within a period in which the image forming by the head unit 11 is not performed. The control part 2 rotates the shaft 40 in the counterclockwise direction by 120° from the initial state using the driving source 44 (see FIG. 11). Then, the longest portion of the first cam 41 is positioned at 4 o'clock, and the longest portion of the second cam 42 is positioned at 2 o'clock. Again, since the shortest portion of the first cam 41 is in contact with the contact portion 61C of the engagement member 60, the engagement member 60 remains at the lower limit position. On the other hand, since the shortest portion of the second cam 42 is in contact with the contact member 33C of the cover 33, the cover 33 is lifted to the upper limit position and is separated from the waste liquid tray 81 (see FIG. 7 and FIG. 14).

Figure 15:
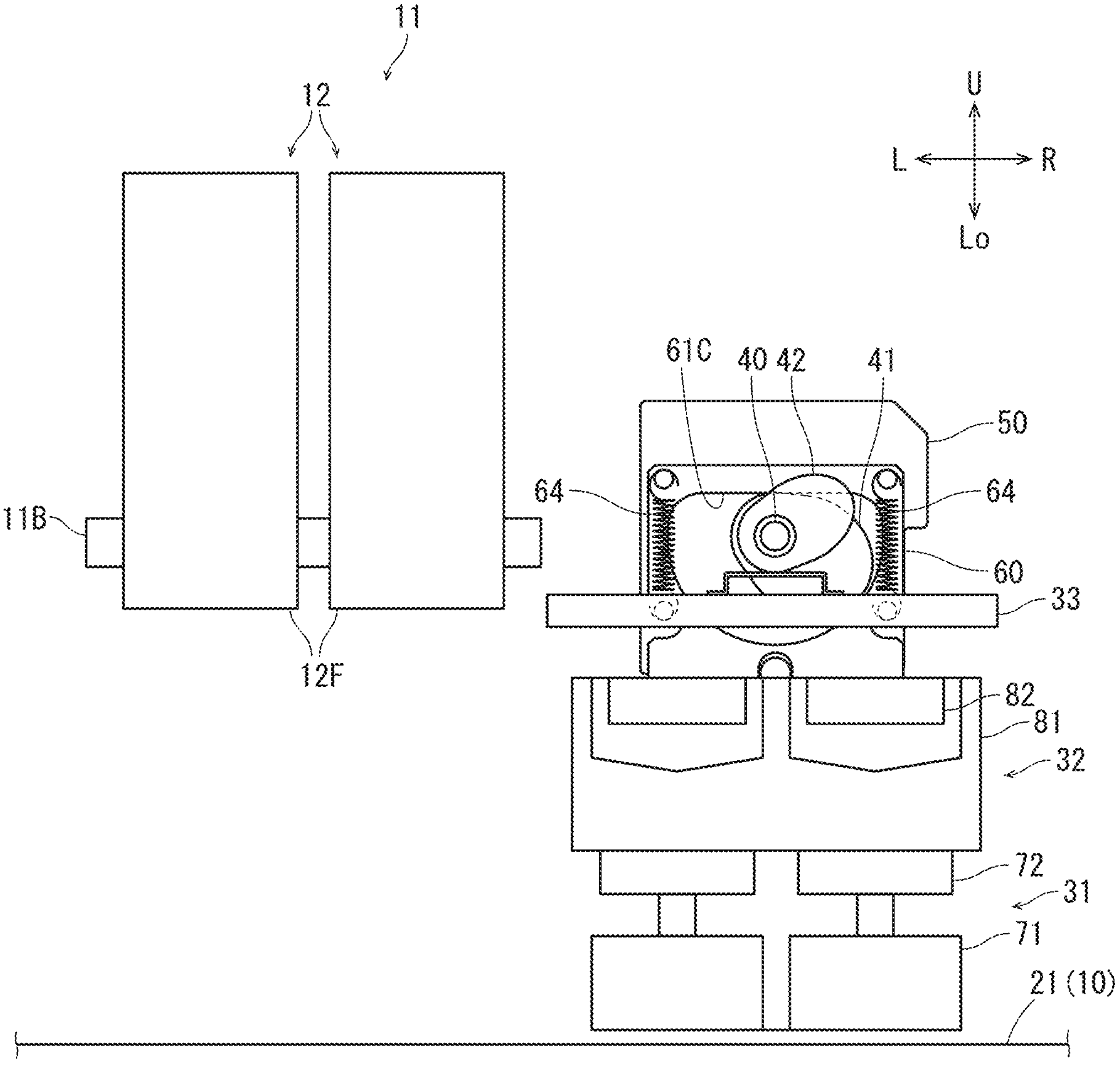
FIG. 15 is a front view showing the operation of the maintenance device according to the embodiment of the present invention.

Next, the control part 2 lifts the head unit 11 to the retracted position using the lifting device 11L (see FIG. 15).

The lifting of the head unit 11 to the retracted position may be performed in parallel with the lifting of the cover 33 (see FIG. 14), and may be performed before the lifting of the cover 33.

Figure 16:
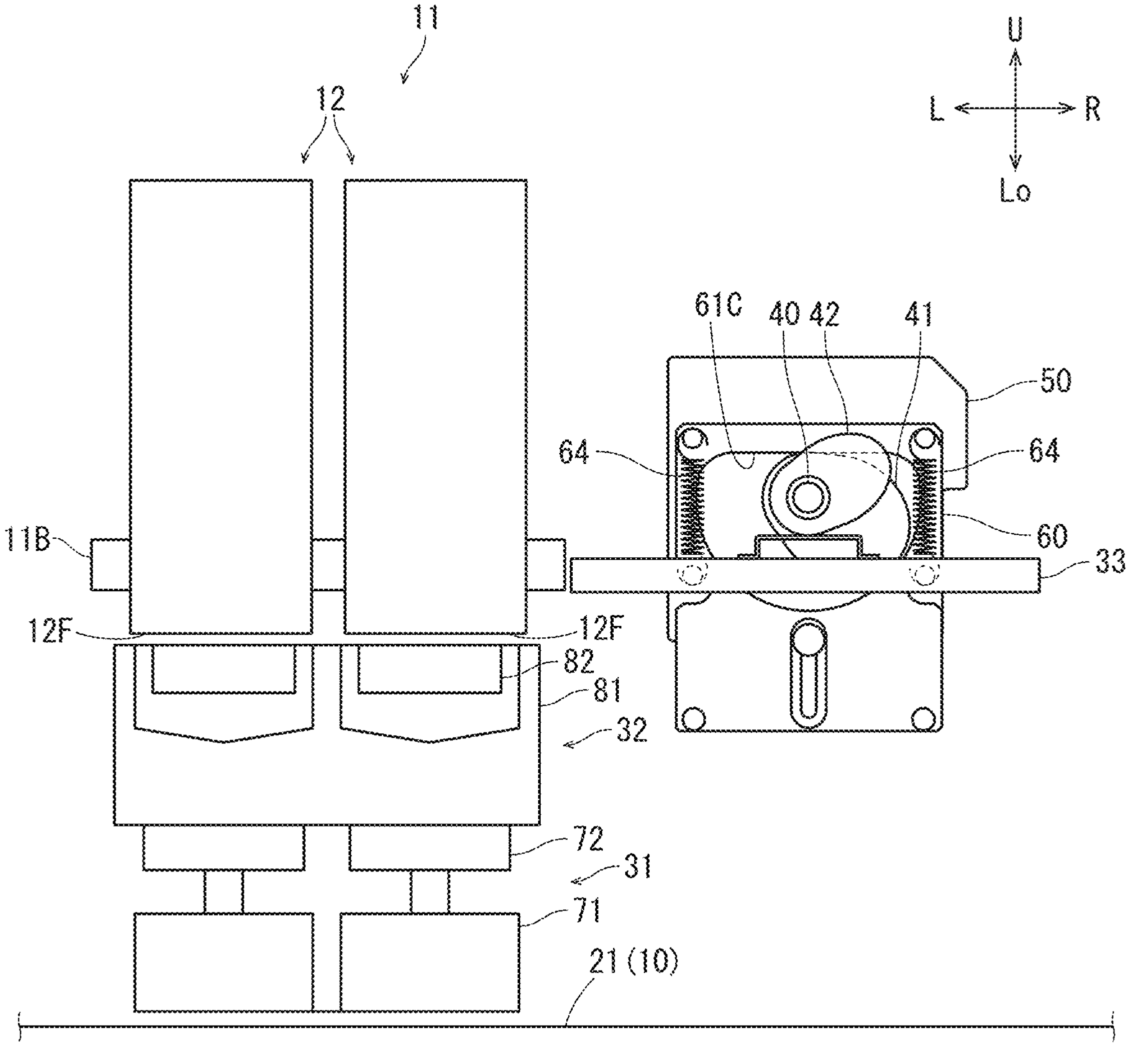
FIG. 16 is a front view showing a third state according to the embodiment of the present invention.

Next, the control part 2 slides the cap unit 31 to the maintenance position using the sliding device 34 (see FIG. 16). In this case, since the wipe unit 32 is mounted on the cap unit 31, the wipe unit 32 also slides to the maintenance position. Then, the control part 2 lowers the head unit 11 by using the lifting device 11L to the position where the nozzle surface 12F is in contact with the cleaning member 82 of the wipe unit 32 (referred to as a wiping position). The control part 2 slides the cleaning member 82 of the wipe unit 32 to clean the nozzle surface 12F. Before cleaning the nozzle surface 12F, a purge process may be performed to forcibly eject the ink having an increased viscosity from the nozzle. When the cleaning of the nozzle surface 12F is completed, the control part 2 slides the cap unit 31 and the wipe unit 32 to the home position using the sliding device 34 (see FIG. 15).

Next, the control part 2 further rotates the shaft 40 in the counterclockwise direction by 120° using the driving source 44 (see FIG. 12). Then, the longest portion of the first cam 41 is positioned at 12 o'clock, and the longest portion of the second cam 42 is positioned at 10 o'clock. In this case, since the shortest portion of the second cam 42 is in contact with the contact member 33C of the cover 33, the cover 33 remains at the upper limit position, but since the longest portion of the first cam 41 is in contact with the contact portion 61C of the engagement member 60, the engagement member 60 is lifted to the upper limit position. At this time, since the engagement part 62 of the engagement member 60 is engaged with the flange portion 81F of the waste liquid tray 81, the wipe unit 32 is lifted together with the engagement member 60, and the wipe unit 32 is separated from the cap unit 31 (see FIG. 8 and FIG. 17). In this case, it is desirable that the wipe unit 32 is lifted to a position where the waste liquid tray 81 is in contact with the cover 33.

Figure 18:
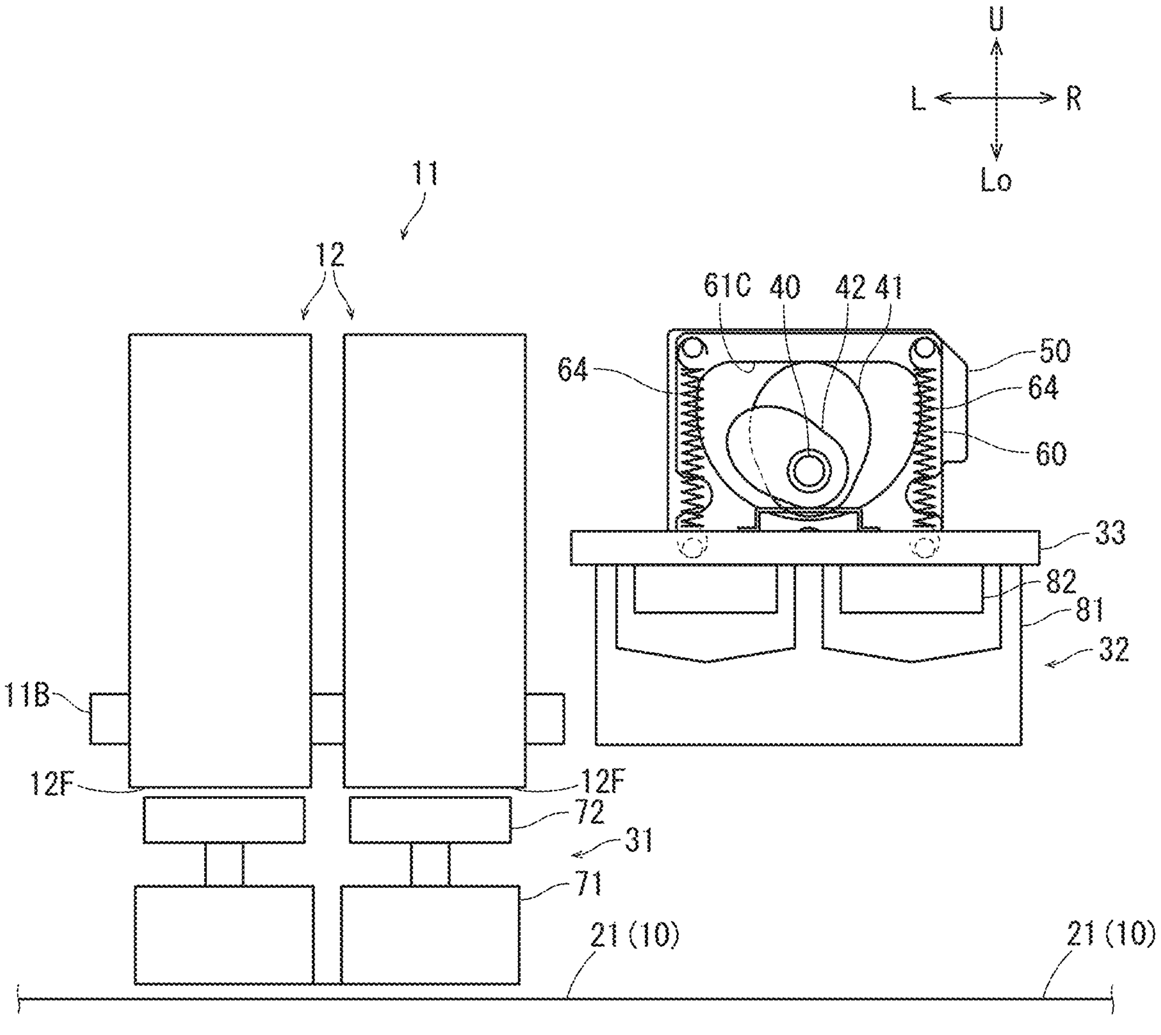
FIG. 18 is a front view showing the operation of the maintenance device according to an embodiment of the present invention.

Next, the control part 2 slides the cap unit 31 to the maintenance position using the sliding device 34 (see FIG. 18). In this case, since the wipe unit 32 is separated from the cap unit 31, the wipe unit 32 remains at the home position. Then, the control part 2 lowers the head unit 11 by using the lifting device 11L to a position where the nozzle surface 12F is in contact with the cap unit 31 (referred to as a capping position). Thus, the cap 72 covers the nozzle surface 12F, and the viscosity increase of the ink in the nozzle is suppressed.

Figure 17:
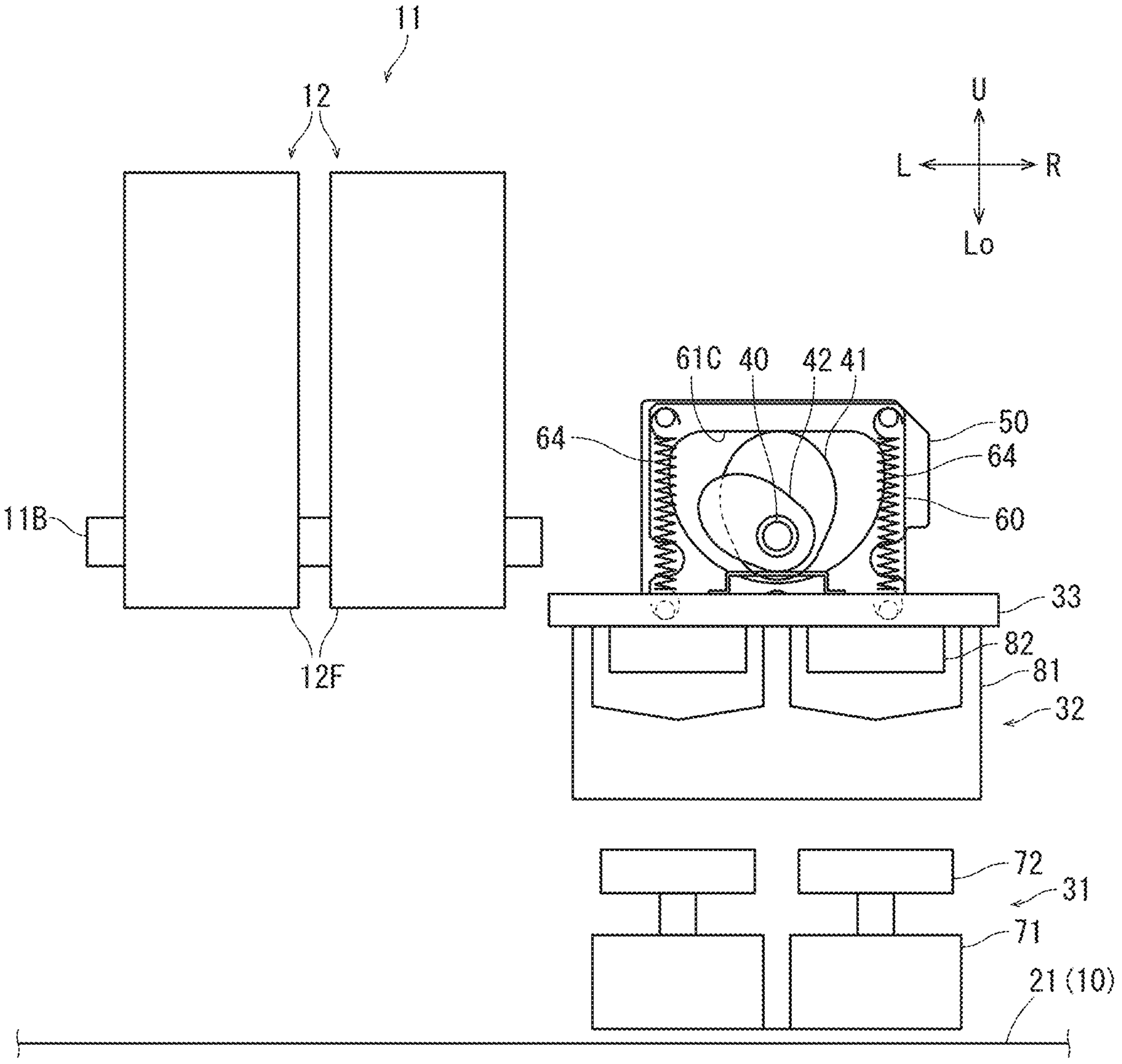
FIG. 17 is a front view showing the operation of the maintenance device according to an embodiment of the present invention.

When the image forming job is inputted, the control part 2 lifts the head unit 11 to the retracted position using the lifting device 11L, and slides the cap unit 31 to the home position using the sliding device 34 (see FIG. 17). Next, the control part 2 lowers the head unit 11 to the image forming position using the lifting device 11L, and rotates the shaft 40 by 120° in the counterclockwise direction using the driving source 44 (see FIG. 10). Then, the engagement member 60 and the cover 33 are lowered to their respective lower limit positions, and then returned to the initial state (see FIG. 6 and FIG. 13).

The inkjet recording apparatus 1 according to the present embodiment described above includes the hard unit 11, the cap unit 31, the wipe unit 32, the cover 33, the engagement member 60, the first cam 41, the second cam 42, the lifting device 11L, and the sliding device 34. The head unit 11 includes one or more inkjet heads 12. The cap unit 31 includes a cap 72 covering the nozzle surface 12F of the inkjet head 12. The wipe unit 32 is mounted on the cap unit 31, and cleans the nozzle surface 12F. The cover 33 is provided above the wipe unit 32. The engagement member 60 is provided so as to be movable upward and downward, and is engaged with the wipe unit 32 to separate the wipe unit 32 from the cap unit 31 when it is moved upward to a predetermined height or above. The first cam 41 moves the engagement member 60 upward and downward. The second cam 42 is interlocked with the first cam 41, and moves the cover 33 upward and downward. The lifting device 11L lifts and lowers the head unit 11 relative to the conveyance path 10 along which the sheet S is conveyed. The sliding device 34 slides the cap unit 31 to a maintenance position below the head unit 11 relatively lifted by the lifting device 11L and a home position on a lateral side of the maintenance position. The first cam 41 and the second cam 42 are displaced into a first state, a second state and a third state. In the first state, the first cam 41 moves the engagement member 60 downward to a predetermined height or below and the second cam 42 brings the cover 33 contact with the wipe unit 32. In the second state, the first cam 41 moves the engagement member 60 downward to the predetermined height or below and the second cam 42 lifts the cover 33 to a height higher than the first state. In the third state, the first cam 41 moves the engagement member 60 upward to the predetermined height or above and the second cam 42 lifts the cover 33 to a height higher than the first state.

In the first state, since the cap unit 31, the wipe unit 32, and the cover 33 are stacked at the home position, drying of the waste liquid in the wipe unit 32 can be prevented. Further, contamination of the cap 72 with foreign matter can be prevented. In the second state, the cap unit 31 and the wipe unit 32 are stacked at the home position, and the cover 33 is separated from the wipe unit 32. When the cap unit 31 is slid to the maintenance position by the sliding device 34 in this state, the wipe unit 32 slides to the maintenance position together with the cap unit 31, so that the nozzle surface 12F can be cleaned. Further, contamination of the cap 72 with foreign matter can be prevented. In the third state, since the wipe unit 32 is separated from the cap unit 31, only the cap unit 31 can be slid to the maintenance position leaving the wipe unit 32 in the home position. Thereafter, the head unit 11 is lowered such that the nozzle surface 12F is in contact with the cap unit 31, and the cap 72 can cover the nozzle surface 12F.

The first state, the second state, and the third state are achieved by displacing the first cam 41 and the second cam 42, but since the first cam 41 and the second cam 42 are interlocked, the first state, the second state, and the third state can be achieved by one driving source 44. Therefore, according to the present embodiment, a number of the driving sources 44 for maintenance of the inkjet head 12 can be suppressed.

According to the inkjet recording apparatus 1 according to the present embodiment, the tension spring 64 having the upper end connected to the engagement member 60 and the lower end connected to the cover 33 is provided, the second cam 42 is provided above the cover 33 and presses the cover 33 downward against the tension spring 64, and the engagement member 60 has the contact portion 61C in contact with the first cam 41 provided above the first cam 41. According to this configuration, when the second cam 42 presses the cover 33 downward, the engagement member 60 is pulled downward through the tension spring 64, and the contact portion 61C is pressed by the first cam 41. Since the pressing of the second cam 42 to the cover 33 and the pressing of the first cam 41 to the engagement member 60 are always maintained by the tension spring 64, the behavior of the cover 33 and the engagement member 60 can be stabilized.

According to the inkjet recording apparatus 1 according to the present embodiment, the cover 33 is in contact with the wipe unit 32 in the third state. According to this configuration, when the cap 72 is mounted on the nozzle surface 12F, drying of the waste liquid in the wipe unit 32 can be prevented.

According to the inkjet recording apparatus 1 according to the present embodiment, the displacement from the first state to the second state, the displacement from the second state to the third state, and the displacement from the third state to the first state are performed by the rotation of the first cam 41 and the second cam 42 in one direction. According to this configuration, the impact caused by the backlash of the driving source 44 for transmitting power to the first cam 41 and the second cam 42 can be avoided.

The above embodiment may be modified as follows.

The above embodiment shows an example where the first cam 41 and the second cam 42 are provided so as not to rotate relatively with respect to the shaft 40, and the first cam 41 and the second cam 42 rotate together with the shaft 40. If the first cam 41 and the second cam 42 are configured to be interlocked, the configuration may be any way. For example, a first shaft and a second shaft may be provided so that the first cam 41 does not rotate relative to the first shaft, the second cam 42 does not rotate relative to the second shaft, and the driving force is transmitted from the first shaft to the second shaft by a gear train, an endless belt, or the like.

The above embodiment shows an example where the cover 33 is biased upward by the tension spring 64, but a compression spring may be provided to bias the cover 33 upward. In this case, the lower end of the tension spring 64 may be engaged with the support member 50 or the like.

The above embodiment shows an example where the engagement member 60 is biased downward by the tension spring 64, a compression spring may be provided to bias the engagement member 60 downward, and the engagement member 60 may be configured to be pressed against the first cam 41 only by gravity. In this case, the upper end of the tension spring 64 may be engaged with the support member 50 or the like.

The above embodiment shows an example where the cleaning member 82 is the blade, but the cleaning member 82 may be one that presses a cloth against the nozzle surface 12F with a pad.

The above embodiment shows an example where the lifting device 11L lifts and lowers the head unit 11, but the lifting device 11L may be configured to lift and lower the conveying unit 7. In short, according to the present invention, by moving the head unit 11 lifting and lowering relative to the conveyance path 10, a space in which the cap unit 31 and the wipe unit 32 can be inserted is formed below the head unit 11.

The invention claimed is:

1. An ink jet recording apparatus comprising:

a head unit including one or more inkjet heads;

a cap unit including a cap covering a nozzle surface of the inkjet head;

a wipe unit which is mounted on the cap unit, and cleans the nozzle surface;

a cover provided above the wipe unit;

an engagement member which is provided so as to be movable upward and downward, and is engaged with the wipe unit to separate the wipe unit from the cap unit when it is moved upward higher than a predetermined height;

a first cam which moves the engagement member upward and downward;

a second cam which is interlocked with the first cam, and moves the cover upward and downward;

a lifting device which lifts and lowers the head unit relative to a conveyance path along which a sheet is conveyed; and a sliding device which slides the cap unit to a maintenance position below the head unit relatively lifted by the lifting device and a home position on a lateral side of the maintenance position, wherein the first cam and the second cam are displaced into a first state, a second state and a third state, in the first state, the first cam moves the engagement member downward to the predetermined height or below and the second cam brings the cover into contact with the wipe unit, in the second state, the first cam moves the engagement member downward to the predetermined height or below and the second cam moves the cover upward to a height higher than the first state, and in the third state, the first cam moves the engagement member upward to the predetermined height or above and the second cam moves the cover upward to a height higher than the first state.

2. The inkjet recording apparatus according to claim 1, comprising:

a tension spring having an upper end connected to the engagement member and a lower end connected to the cover, wherein the second cam is provided above the cover, and presses the cover downward against a biasing force of the tension spring, and the engagement member has a contact portion which is in contact with the first cam and provided above the first cam.

3. The inkjet recording apparatus according to claim 1, wherein in the third state, the cover is in contact with the wipe unit.

4. The inkjet recording apparatus according to claim 1, wherein displacement from the first state to the second state, displacement from the second state to the third state and displacement from the third state to the first state are achieved by rotation of the first cam and the second cam in one direction.

* * * * *